United States Patent
Kümmel et al.

(10) Patent No.: US 12,522,063 B2
(45) Date of Patent: Jan. 13, 2026

(54) MOTOR HOLDER AND VEHICLE COMPRISING SUCH A MOTOR HOLDER

(71) Applicant: MAN Truck & Bus SE, Munich (DE)

(72) Inventors: Daniel Kümmel, Munich (DE); Stefan Brendler, Munich (DE); Patrick Schwedes, Munich (DE); Willi Kusch, Wangen im Allgäu (DE)

(73) Assignee: MAN Truck & Bus SE, Munich (DE)

( * ) Notice: Subject to any disclaimer, the term of this patent is extended or adjusted under 35 U.S.C. 154(b) by 401 days.

(21) Appl. No.: 18/022,141

(22) PCT Filed: Jul. 30, 2021

(86) PCT No.: PCT/EP2021/071365
§ 371 (c)(1),
(2) Date: Feb. 18, 2023

(87) PCT Pub. No.: WO2022/037922
PCT Pub. Date: Feb. 24, 2022

(65) Prior Publication Data
US 2023/0302888 A1    Sep. 28, 2023

(30) Foreign Application Priority Data
Aug. 20, 2020   (DE) ..................... 10 2020 121 828.1

(51) Int. Cl.
*B60K 1/04*     (2019.01)
*B62D 21/02*    (2006.01)

(52) U.S. Cl.
CPC ............... *B60K 1/04* (2013.01); *B62D 21/02* (2013.01)

(58) Field of Classification Search
CPC ...... B60K 1/02; B60K 1/04; B60K 2001/006; B60K 2001/0444; B60K 2001/0416; B60K 2001/0438
See application file for complete search history.

(56) References Cited

U.S. PATENT DOCUMENTS

| | | | |
|---|---|---|---|
| 7,198,130 B2 * | 4/2007 | Schimke | B60K 6/46 180/291 |
| 10,493,837 B1 * | 12/2019 | Angelo | B60L 50/66 |

(Continued)

FOREIGN PATENT DOCUMENTS

| | | |
|---|---|---|
| CN | 102371881 A | 3/2012 |
| CN | 103338954 A | 10/2013 |

(Continued)

OTHER PUBLICATIONS

European Office Action issued in European Patent Application No. 21749863.3 dated Jun. 27, 2024 with English translation through google translate.

(Continued)

*Primary Examiner* — Jeffrey J Restifo
(74) *Attorney, Agent, or Firm* — Weber Rosselli & Cannon LLP

(57) ABSTRACT

The invention relates to a motor holder (3.1, 3.2, 3.3, 3.4) for fastening an electric motor (1) to a support frame (2) of a vehicle (10), wherein the support frame (2) preferably comprises two longitudinal members (2 $b_j$, 2$b_2$) which are spaced apart from each other and are interconnected via a plurality of cross members (2$a_j$, 2$a_2$, 2$a_3$, 2$a_4$). The invention further relates to a vehicle (10) having a motor holder (3.1, 3.2, 3.3, 3.4) of this type. It is provided here that the motor holder (3.1, 3.2, 3.3, 3.4) comprises a first fastening region (3$a$) which is fastened to one of the longitudinal members (2$b_j$, 2$b_2$); a second fastening region (3$b$) which is fastened to the electric motor (1) or to a support structure of the electric motor (1); and a spacer (3$c$) connecting the first and second fastening region (3$a$, 3$b$), wherein the spacer (3$c$) spaces the second fastening region (3$b$) from the first fastening region (3$a$) in such a manner that the second (Continued)

Figure 1:
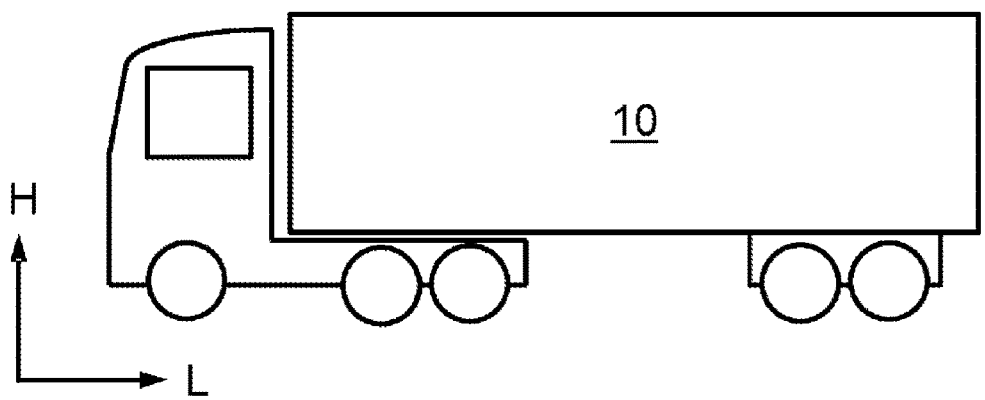
Figure 1:
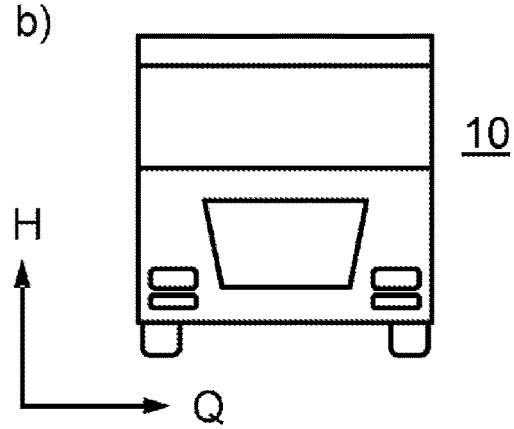
Figure 1:
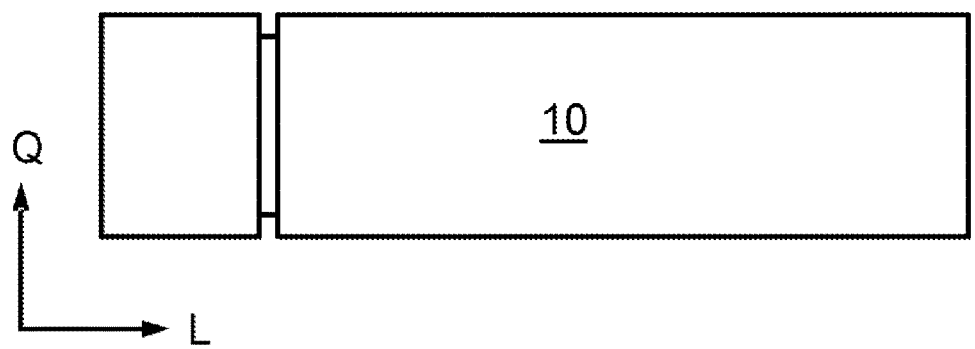

fastening region (3b) is arranged below the longitudinal members ($2b_j$, $2b_2$) in the vertical direction H of the vehicle.

20 Claims, 4 Drawing Sheets

(56) References Cited

U.S. PATENT DOCUMENTS

| | | | | |
|---|---|---|---|---|
| 10,596,913 | B2* | 3/2020 | Healy | B60L 15/2018 |
| 10,899,214 | B2* | 1/2021 | Sloan | B60K 1/04 |
| 11,043,707 | B2* | 6/2021 | Sloan | B60K 11/02 |
| 11,043,714 | B2* | 6/2021 | Sloan | B60K 1/04 |
| 11,124,076 | B1* | 9/2021 | Borghi | B62D 21/02 |
| 11,345,331 | B2* | 5/2022 | McKibben | B60K 15/03 |
| 11,414,134 | B2* | 8/2022 | Timofeev | B60K 1/00 |
| 11,548,363 | B2* | 1/2023 | Kumagai | B62D 21/02 |
| 11,926,207 | B2* | 3/2024 | McKibben | B60L 58/21 |
| 11,932,098 | B2* | 3/2024 | Hendriks | B60L 50/66 |
| 11,938,804 | B2* | 3/2024 | Andersson | H01M 50/249 |
| 12,024,029 | B2* | 7/2024 | Healy | B60L 15/2009 |
| 12,070,996 | B2* | 8/2024 | Kvaldén | B62D 21/09 |
| 12,202,542 | B2* | 1/2025 | Hendriks | B60K 1/04 |
| 12,208,669 | B2* | 1/2025 | Landvik | B62D 21/04 |
| 12,257,889 | B2* | 3/2025 | Ragot | H01M 50/262 |
| 12,286,005 | B2* | 4/2025 | Hörder | B60L 58/16 |
| 2018/0366703 | A1* | 12/2018 | Izumi | H01M 50/249 |
| 2021/0380001 | A1* | 12/2021 | Hörder | H01M 50/204 |
| 2023/0158880 | A1* | 5/2023 | Ragot | B62D 21/155 180/68.5 |
| 2023/0302888 | A1* | 9/2023 | Kümmel | B60K 1/00 |
| 2023/0312029 | A1* | 10/2023 | Layfield | B60D 1/015 180/6.5 |
| 2024/0010079 | A1* | 1/2024 | Kümmel | B60L 50/66 |
| 2024/0075821 | A1* | 3/2024 | Lundin | H01M 50/249 |
| 2024/0149657 | A1* | 5/2024 | Coupal-Sikes | F16B 43/001 |
| 2024/0166040 | A1* | 5/2024 | Coupal-Sikes | H01M 50/242 |
| 2024/0286480 | A1* | 8/2024 | Kumagai | B60L 50/66 |
| 2024/0308321 | A1* | 9/2024 | Ragot | H01M 50/249 |
| 2025/0135899 | A1* | 5/2025 | Foley | B62D 59/04 |
| 2025/0153555 | A1* | 5/2025 | Little | B60L 50/66 |

FOREIGN PATENT DOCUMENTS

| | | |
|---|---|---|
| CN | 203681239 U | 7/2014 |
| CN | 203974514 U | 12/2014 |
| CN | 106741185 A | 5/2017 |
| CN | 109094347 A | 12/2018 |
| CN | 110239325 A | 9/2019 |
| CN | 110803007 A | 2/2020 |
| DE | 19814975 A1 | 10/1999 |
| DE | 102011010199 A1 | 11/2011 |
| WO | 2020003835 A1 | 1/2020 |

OTHER PUBLICATIONS

German Search Report issued in German Patent Application No. 102020121828.1 dated Jul. 1, 2021. English translation not available.

International Search Report with translation and Written Opinion dated Oct. 28, 2021.

Chinese Office Action issued in Chinese Patent Application No. 202180056192.6 dated Aug. 30, 2025 with English translation.

* cited by examiner a)

b)

c)

MOTOR HOLDER AND VEHICLE COMPRISING SUCH A MOTOR HOLDER

CROSS-REFERENCE TO RELATED APPLICATIONS

This application is a 371 application of PCT/EP2021/071365 filed Jul. 30, 2021 which claims benefit of and priority to German Patent Application Serial No. DE102020121828.1 filed Aug. 20, 2020, the disclosures of the above-identified applications are hereby incorporated by reference in their entirety.

The invention relates to a motor holder for fastening an electric motor to a support frame of a vehicle, as well as a vehicle comprising such a motor holder.

Generally, in utility vehicles the mounting system for the motor is implemented via brackets of the chassis frame which are generally present repeatedly and mount the motor at a plurality of fastening points (for example by means of a 4-point mounting system) on the frame of the vehicle. The structural design of the brackets—which are also denoted as motor mounts or motor holders—is determined by the force load so that the motor holders are designed to have the highest possible load-bearing capacity or stiffness, in particular in the direction of action of the operating forces.

Due to the increasing electrification of utility vehicles and the associated use of electric motors instead of internal combustion engines, new requirements are also set for the corresponding motor holders. Thus the two types of motor generally differ in their structural design (dimensions, weight or weight distribution) so that—in particular in comparison with the known designs for mounting internal combustion engines—there is a need for an improved and/or alternative solution for mounting an electric motor on a support frame of a vehicle.

Accordingly, it is the object of the invention to provide a solution for this requirement and by which the drawbacks of conventional techniques can be avoided. In particular, it is the object of the invention to provide a solution by which it is possible to achieve a simple and secure fastening of an electric motor to the vehicle.

These objects can be achieved by the features of the independent claims. Advantageous embodiments and applications of the invention form the subject matter of the dependent claims and are explained in more detail in the following description with partial reference to the figures.

According to a first independent solution concept, a preferably electrically driven vehicle is provided with an electric motor. Preferably, the vehicle is a utility vehicle, i.e. a vehicle which due to its construction and configuration is designed to convey people, to transport goods or to tow trailer vehicles. Merely by way of example, the vehicle can be a truck, a bus or an articulated vehicle.

The vehicle comprises a support frame which has two longitudinal members (for example C-profile members) which are spaced apart from each other and which are connected together via a plurality of cross members. Moreover, the vehicle comprises a holding device, the electric motor (for example an electric drive motor) being fastened thereby to the support frame. It is provided that the holding device comprises at least one, preferably four, motor holders having the following components: a first fastening region which is fastened to one of the longitudinal members, preferably releasably; a second fastening region which is fastened to the electric motor or to a support structure of the electric motor, preferably releasably; and a spacer which connects the first and second fastening region and which spaces the second fastening region from the first fastening region in such a manner that the second fastening region is arranged below the longitudinal members in the vehicle vertical direction H. Advantageously, it is possible to achieve thereby the lowest possible installation position of the electric motor in the vehicle and it is possible to obtain thereby a lowering of the vehicle center of gravity as a whole, which positively influences the driving behavior.

According to a first aspect of the invention, the spacer can have an extent of at least 10 cm, preferably at least 15 cm, in the vehicle vertical direction. Additionally or alternatively, the second fastening region can be arranged at least 10 cm, preferably at least 15 cm, below the longitudinal members in the vehicle vertical direction. In this context, the expression "below" the longitudinal members can be understood to mean, in particular, below the lower edge or below the lower limit of the longitudinal members.

In order to achieve, also advantageously, a mounting of the motor which is as stable as possible, according to a further aspect of the invention the second fastening region (which can be configured for example in the form of a single through-bore for receiving a fastening means) can be arranged at the height of the center of gravity of the electric motor in the vehicle vertical direction. In other words, the electric motor can be mounted level with the center of gravity. The expressions "at the height of the center of gravity" or "level with the center of gravity" can be understood to mean that (in the vehicle vertical direction) the second fastening region is substantially located at the same height as the center of gravity of the electric motor. Preferably, the height of the second fastening region deviates by less than 5 cm from the height of the center of gravity of the electric motor. Additionally or alternatively, the center of gravity of the electric motor can also be arranged below the longitudinal members in the vehicle vertical direction. As already mentioned above, the expression "below" the longitudinal members can also be understood to mean, in particular, below the lower edge or lower limit of the longitudinal members. Advantageously, it is also possible to achieve thereby the lowering of the vehicle center of gravity, which positively influences the driving behavior.

According to a further aspect of the invention, the at least one motor holder can be configured as a substantially L-shaped molded part. The molded part—preferably an aluminum molded part—is designed to have a first limb and a second limb, preferably oriented substantially perpendicular to the first limb, wherein the first fastening region is arranged on the first limb and the second fastening region is arranged on the second limb. Preferably, the second limb is designed to be configured shorter than the first limb. For example, the first limb can have a length of approximately 35-45 cm, for example 40 cm, and the second limb can have a length of approximately 10-15 cm, for example 13 cm. Moreover, preferably no further support structures are designed to be present between the two limbs. The advantage of this embodiment is that the second fastening region is consequently located as far as possible directly below the corresponding longitudinal member of the support frame and, as a result, a support on a wide bearing base can be achieved.

According to a further aspect of the invention, the vehicle can also comprise at least one traction battery module. The traction battery module, which can also be denoted as a high-voltage storage module or traction battery module, can have for example a plurality of interconnected battery cells. The aforementioned traction battery module can also be fastened by means of the at least one motor holder— preferably via the first fastening region thereof—to the support frame. Additionally or alternatively, the at least one motor holder can also serve both for fastening the electric motor to the support frame and for fastening the traction battery module to the support frame. In other words, both the electric motor and the traction battery module can be fastened via the at least one motor holder to the support frame. Advantageously, the motor holder fulfills thereby a dual function, by permitting both the attachment of the electric motor and the attachment of the traction battery module to the support frame by means of one and the same component. Accordingly, in this context the motor holder can also be denoted as the motor-battery holder.

According to a further aspect of the invention, the traction battery module, the first fastening region of the at least one motor holder and the longitudinal member, i.e. the longitudinal member to which the corresponding motor holder is fastened, can comprise through-openings which correspond to one another and which are preferably arranged in a grid pattern. For example, the through-openings can be configured as a plurality of holes (for example bores in a grid pattern) arranged in a square and/or rectangular pattern. In this context, the expression "corresponding" can be understood to mean that in each case all three components comprise the same hole pattern, i.e. the same number of through-openings in the same arrangement. Fastening means which extend through the corresponding through-openings can be received in each case in the through-openings for non-positively and/or positively fixing said components. The fastening means can be, for example, screws, bolts and/or rivets. As a whole, a high level of stiffness of the attachment of the above connection can be advantageously achieved thereby.

According to a further aspect of the invention, the first fastening region of the at least one motor holder can be pinned and/or screwed and/or riveted between the longitudinal member and the traction battery module. Additionally or alternatively, the traction battery module can be fastened to the at least one motor holder on the vehicle exterior, preferably to the first fastening region thereof on the vehicle exterior. In other words, the traction battery module can be located at a greater transverse spacing relative to the longitudinal central plane of the vehicle than the corresponding motor holder. Additionally or alternatively, the traction battery module and the longitudinal member can be fastened on opposing sides of the first fastening region of the at least one motor holder or the at least one motor-battery holder. Preferably, the traction battery module is fastened to a side of the first fastening region on the vehicle exterior and the longitudinal member is fastened to a side of the first fastening region on the vehicle interior. As already mentioned above, by combining the motor mount and the battery mount in a mounting bracket, a possibility is advantageously provided for attaching the different components using few parts.

According to a further aspect of the invention, the first fastening region of the least one motor holder can be fastened on the vehicle exterior to one of the longitudinal members. Additionally or alternatively, the first fastening region of the at least one motor holder can also be fastened as closely as possible to the thrust center of one of the longitudinal members. "Thrust center" can be understood to mean the point of a profile cross section through which the resultant of the transverse forces has to pass in order to achieve a torsion-free action of force or so that no torsion is exerted on the cross section.

Moreover, in order to achieve advantageously a damping action in the motor mounting system, additionally or alternatively the second fastening region of the at least one motor holder can also comprise a resilient bearing, preferably a rubber-metal buffer, for damping vibrations. Such components are known in principle in the prior art and generally consist of a metal bearing bush, surrounded by at least one rubber body. It is particularly advantageous in this context if the second fastening region is configured in the form of a single through-bore into which the aforementioned resilient bearing is pressed.

According to a further aspect of the invention, the holding device can comprise a plurality of, preferably at least four, motor holders. Preferably, the motor holders are configured identically, wherein alternatively the motor holders can be also configured—at least partially—according to different embodiments described in this document. In the event that the holding device comprises at least four motor holders, preferably at least two motor holders are designed to be fastened to each of the longitudinal members at mounting positions offset in the vehicle longitudinal direction. Advantageously, a particularly stable mounting can thus be achieved in the form of a 4-point mounting system.

According to a further aspect of the invention, a transverse spacing of the two longitudinal members can be widened in a front region of the vehicle. In other words, the two longitudinal members are not designed to run in parallel over their entire length but to diverge from one another in a front region. However, in order to permit advantageously as far as possible a uniform mounting position, the first fastening regions of the motor holders in each case can comprise at least one spacing compensating element (for example in the form of at least one spacer sleeve). The respective extent of the spacing compensating element in the vehicle transverse direction can be adapted to the transverse spacing of the respective longitudinal member at the corresponding mounting positions, such that the second fastening regions and/or the outer faces of all of the motor holders on a longitudinal member on the vehicle exterior are located at the same transverse spacing relative to the longitudinal central plane of the vehicle. In other words, the spacing compensating elements can compensate for the change in the path of the longitudinal member such that the motor holders, or in particular the outer faces thereof on the vehicle exterior, are arranged flush in the vehicle longitudinal direction.

According to a further aspect of the invention, the respective spacing compensating elements can be configured in the form of spacer sleeves. Preferably, the spacer sleeves are arranged concentrically around the aforementioned through-openings of the first fastening region. Additionally or alternatively, the outer faces of all of the motor holders can form in some portions on a longitudinal member a planar bearing surface, which is perpendicular to the vehicle transverse direction, for at least one traction battery module. Advantageously, this provides a simple possibility for compensating for the variable spacing between the longitudinal members.

According to a further aspect of the invention, the vehicle can comprise at least two traction battery modules, wherein at least one traction battery module is fastened to each of the longitudinal members via at least two motor holders. For example, the vehicle can comprise a left-hand and a right-hand traction battery module, wherein each of the traction battery modules is fastened to the support frame by means of two motor holders.

According to a further independent aspect of the invention, a motor holder is provided for fastening a motor, preferably an electric motor, to a support frame of a vehicle.

The support frame can have, for example, two longitudinal members (for example C-profile members) which are spaced apart from each other and which are connected together via a plurality of cross members. The aforementioned motor holder, which in this context can also be denoted as the motor mount or bracket, is configured as a substantially L-shaped molded part (for example an aluminum molded part) having a first limb and a second limb which is preferably shorter in comparison with the first limb. For example, the first limb can have a length of 35-45 cm, for example 40 cm, and the second limb can have a length of approximately 10-15 cm, for example 13 cm. Preferably, the two limbs are located substantially perpendicular to one another. Moreover, preferably no further supporting structures and/or further connections are designed to be present between the two limbs.

Moreover, the first limb comprises a first fastening region, preferably for releasably fastening the motor holder to the support frame of the vehicle. Moreover, the second limb comprises a second fastening region, preferably for releasably fastening the motor holder to the motor or a support structure of the motor.

According to a further aspect of the invention, the first fastening region can comprise a plurality of through-openings which preferably run parallel to one another and/or are arranged in a grid pattern for receiving fastening means, preferably for receiving pins, screws and/or rivets. Preferably, the first fastening region comprises at least 10, particularly preferably at least 15, through-openings. Moreover, the through-openings are preferably designed to be arranged in a square and/or rectangular pattern.

According to a further aspect of the invention, the second fastening region can comprise merely one through-bore for receiving a fastening means, preferably for receiving a pin, a screw and/or a rivet. Additionally or alternatively, the second fastening region can comprise a resilient bearing, preferably in the form of a rubber-metal buffer. Preferably, the resilient bearing is pressed into the aforementioned through-bore.

According to a further aspect of the invention, if the first fastening region comprises a plurality of through-openings, the respective through-openings can be concentrically surrounded in each case by spacer sleeves, the spacing between the first limb and the support frame being able to be set via the length thereof when fastening the motor holder to the support frame of the vehicle. In other words, the spacing of the first limb from the support frame can be varied by means of the aforementioned spacer sleeves.

The above-described aspects and features of the invention can be combined together in any manner. Further details and advantages of the invention are described hereinafter with reference to the accompanying drawings. In the drawings:

FIG. 1: shows various schematic views (side view, front view and plan view) of a vehicle according to an embodiment of the invention.

Figure 2:
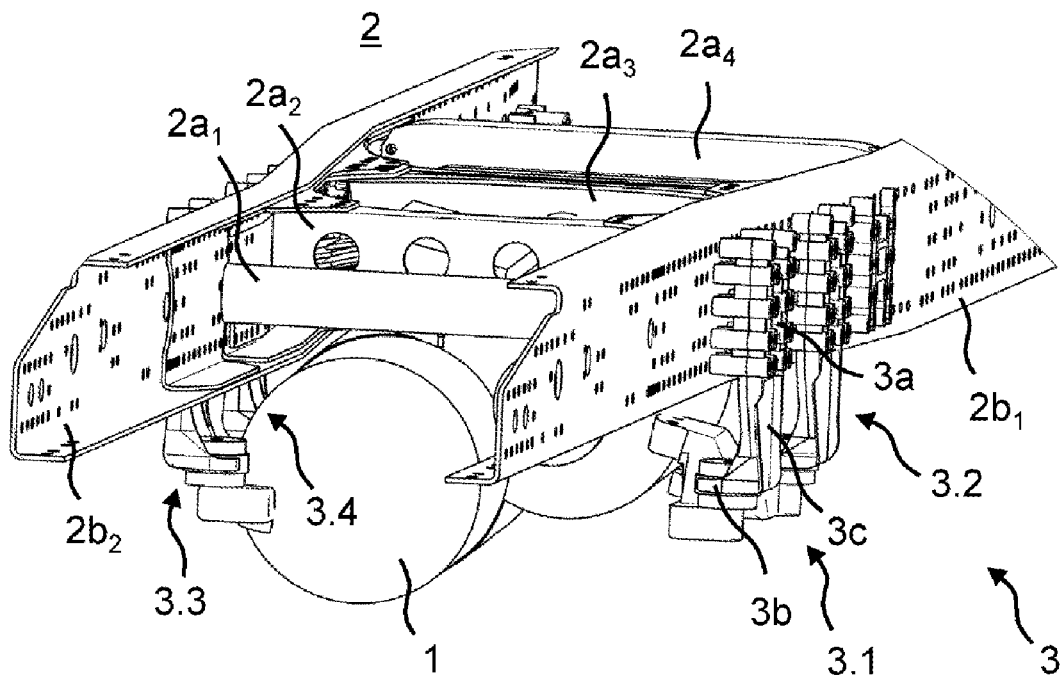
Figure 2:
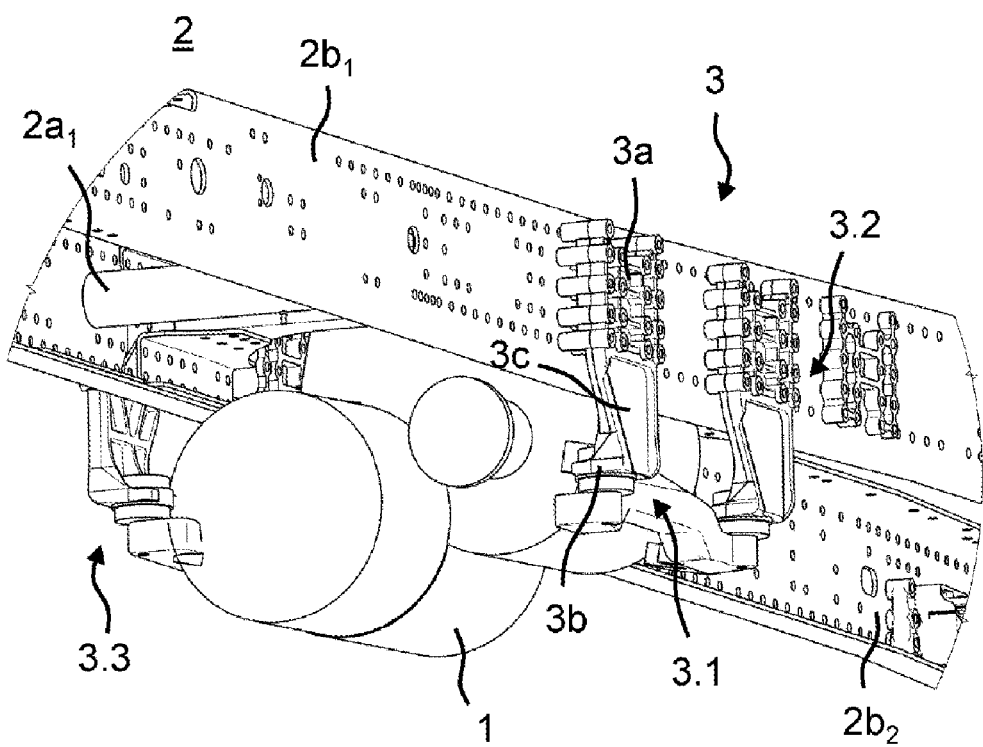

FIG. 2: shows two different views of a schematic detailed view of a motor mounting system of a vehicle according to an embodiment of the invention.

Figure 3:
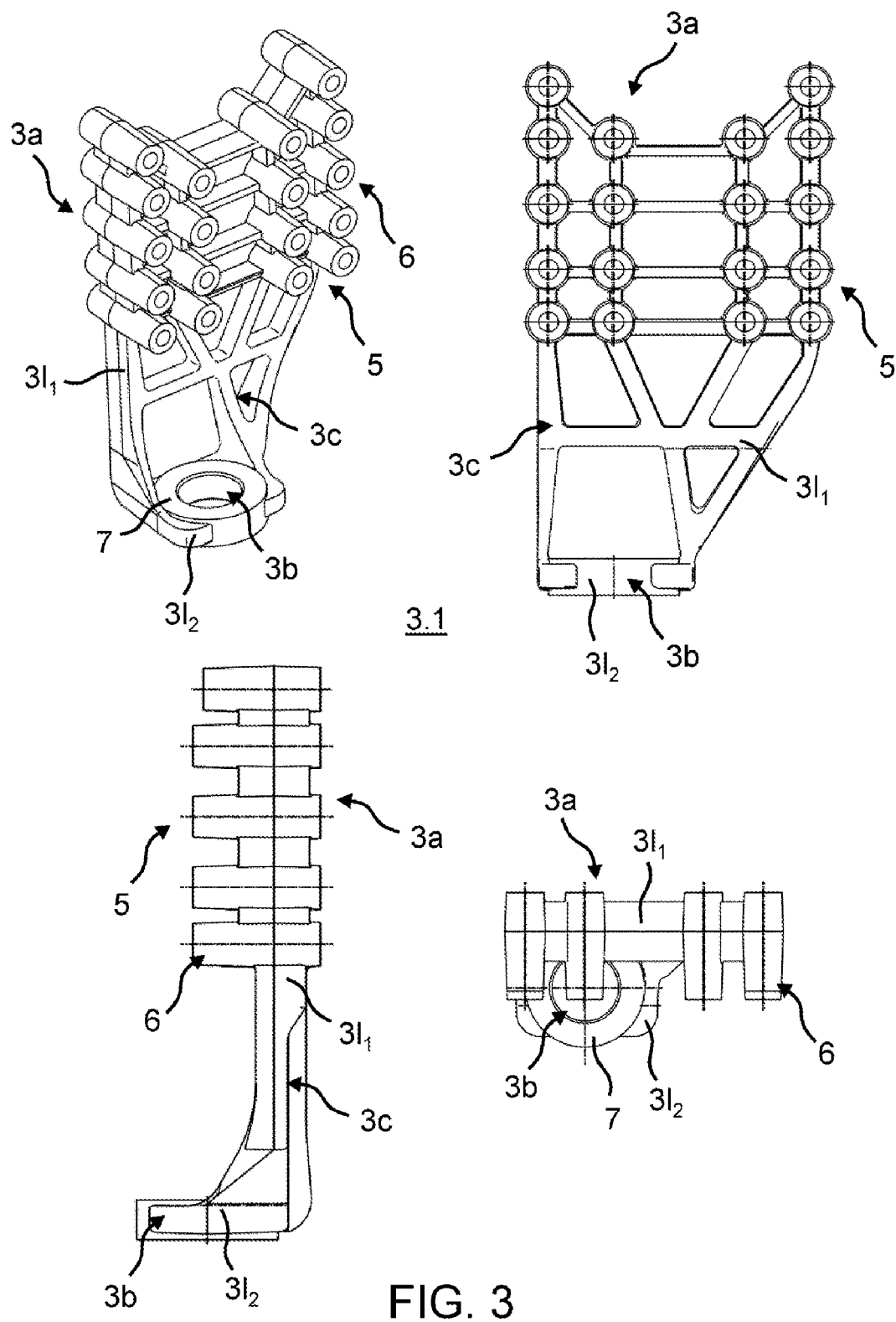
Figure 4:
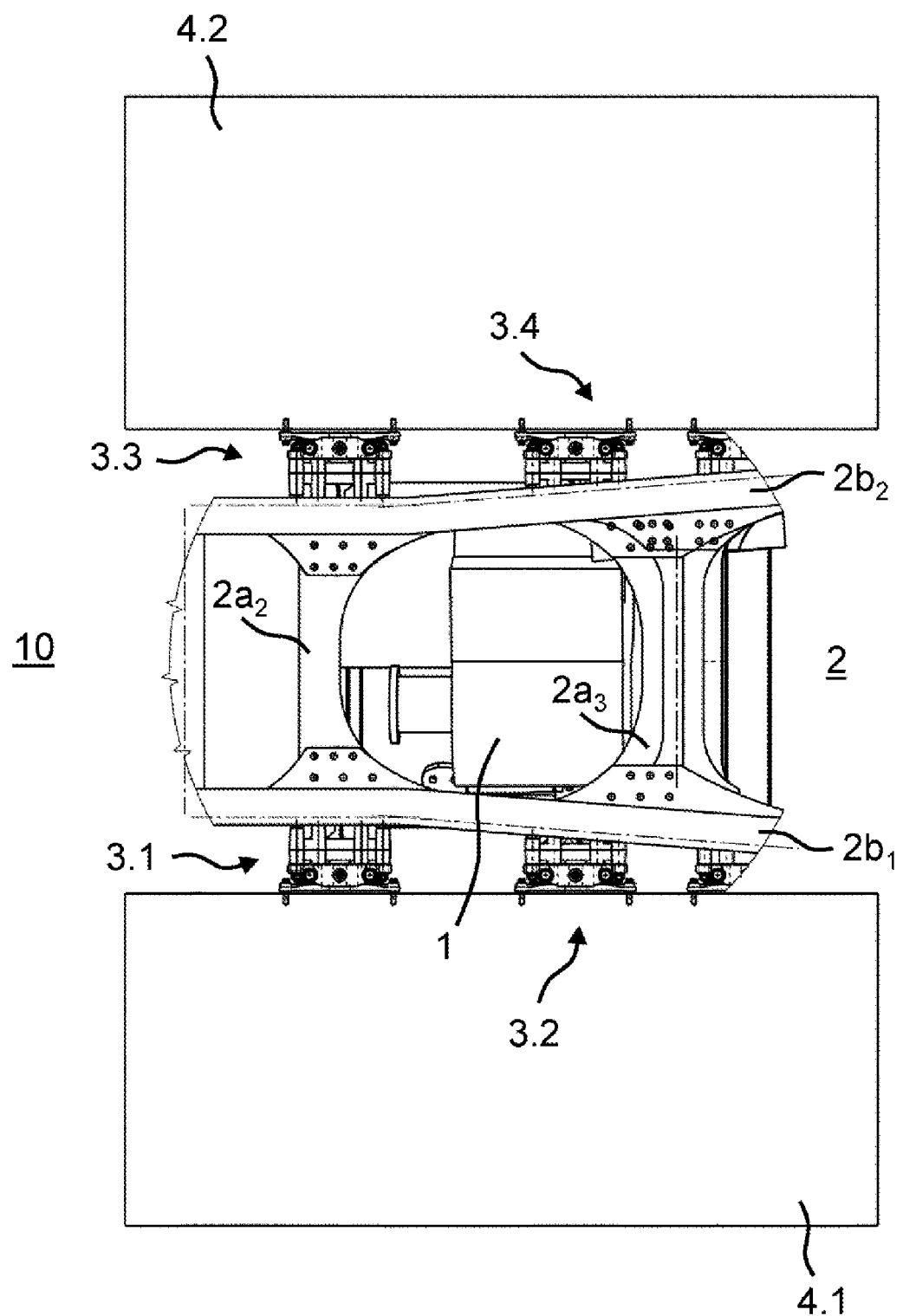

FIG. 3: shows various views of a motor holder for fastening a motor to a support frame of a vehicle according to an embodiment of the invention; and FIG. 4: shows a schematic view of a detail of a motor mounting system of a vehicle according to a further embodiment of the invention.

Elements which are the same or functionally equivalent are denoted in all of the figures by the same reference signs and in some cases are not separately described.

FIG. 1 shows various schematic views (side view, front view, plan view) of a vehicle 10 according to a first embodiment of the invention.

In the present case the vehicle 10—merely by way of example—is an articulated vehicle consisting of a tractor unit and a semitrailer. The different views denoted by a), b) and c) of the vehicle 10 and the directions marked therein by means of arrows serve merely to illustrate directional information used as a whole in this document including a vehicle longitudinal direction L, a vehicle vertical direction H and a vehicle transverse direction Q. According to the conventional use these three directions are oriented along the main axes or axes of symmetry of the vehicle 10 and are located mutually perpendicular to one another. In detail, the view a) shows a side view of the vehicle 10 in a plane perpendicular to the vehicle transverse direction Q, the view b) shows a front view of the vehicle 10 in a plane perpendicular to the vehicle longitudinal direction L and the view c) shows a plan view of the vehicle 10 in a plane perpendicular to the vehicle vertical direction H. Based on this directional information, further details are now discussed hereinafter in more detail relative to the embodiment of the motor mounting system.

FIG. 2 shows two different views of a schematic detailed view of a (the same) motor mounting system of the vehicle 10 according to an embodiment of the invention. The vehicle 10, not shown in more detail here, has a support frame 2 in a composite design which comprises two longitudinal members $2b_1$, $2b_2$ which are spaced apart from each other and which are connected together via a plurality of cross members $2a_1$, $2a_2$, $2a_3$, $2a_4$. Merely by way of example, the two longitudinal members $2b_1$, $2b_2$ are configured here as C-profile members running in the vehicle longitudinal direction L.

Moreover, the vehicle comprises an electric motor 1 (for example an electric drive motor) which is fastened by means of a holding device 3, described in more detail hereinafter, to the support frame 2. To this end, the holding device 3 in the present case comprises merely by way of example four separate motor holders 3.1, 3.2, 3.3 and 3.4 for producing a 4-point mounting system of the electric motor 1. The individual motor holders 3.1, 3.2, 3.3, 3.4 have in each case a first fastening region 3a which is fastened in each case to one of the longitudinal members $2b_1$, $2b_2$, preferably releasably (for improved clarity the corresponding region—and the following region—is only marked for the motor holder 3.1 in FIG. 2). Moreover, each of the motor holders 3.1, 3.2, 3.3, 3.4 comprises a second fastening region 3b which is fastened to the electric motor 1, preferably releasably. Moreover, it is provided that the motor holders 3.1, 3.2, 3.3, 3.4 in each case comprise a spacer 3c which connects the first and second fastening region 3a, 3b and which spaces the second fastening region 3b from the first fastening region 3a, (in the present case for example by approximately 15 cm) such that the second fastening region 3b is arranged below the longitudinal members $2b_1$, $2b_2$ in the vehicle vertical direction H. As is also visible in the two views of FIG. 2, advantageously overall a "low" installed position of the electric motor 1 in the vehicle 10 is achieved thereby—relative to the vehicle vertical direction H. It is particularly advantageous if the center of gravity of the electric motor 1 is located below the longitudinal members in the vehicle vertical direction and/or if the second fastening region 3b of the motor holders 3.1, 3.2, 3.3, 3.4 in each case is located at the height of the center of gravity of the electric motor 1. Advantageously, overall a support of the electric motor 1 which is as optimal as possible can be provided thereby on a broad bearing base level with the center of gravity.

FIG. 3 shows three different views of a motor holder 3.1 for fastening a motor, preferably an electric motor 1, to a support frame 2 of a vehicle 10 according to an embodiment of the invention. The corresponding support frame 2 can, as shown for example in FIG. 2, have merely by way of example two longitudinal members $2b_1$, $2b_2$ which are spaced apart from each other and which are connected together via a plurality of cross members $2a_1$, $2a_2$, $2a_3$, $2a_4$. The motor holder 3.1 which can also be denoted as a motor mount or bracket is configured as a substantially L-shaped molded part (for example an aluminum molded part) and has a first limb $3l_1$ and a second limb $3l_2$ which is preferably shorter in comparison with the first limb $3l_1$. Merely by way of example, the first limb $3l_1$ can have a length of 40 cm and the second limb $3l_2$ a length of approximately 13 cm. Preferably, the two limbs $3l_1$, $3l_2$ are located substantially perpendicular to one another. Moreover, preferably no further supporting structures and/or further connections are designed to be present between the two limbs $3l_1$, $3l_2$.

The first limb $3l_1$, which is preferably configured as a substantially planar molded part, comprises a first fastening region 3a for fastening the motor holder 3.1, preferably releasably, to the support frame 2, preferably to a longitudinal member $2b_1$, $2b_2$ of the vehicle 10. The first fastening region 3a can comprise a plurality of through-openings 5 which preferably run parallel to one another, for receiving fastening means, preferably for receiving pins, screws and/or rivets.

In the present case, merely by way of example the motor holder 3.1 comprises 18 through-openings which are arranged in each case in rows of 5 or 4 bores spaced apart from each other. Moreover, the first limb $3l_1$ comprises a spacer 3c which spaces the first fastening region 3a from the second limb $3l_2$ or from the apex of the two limbs $3l_1$ and $3l_2$.

The second limb $3l_2$, which is preferably also configured as a substantially planar molded part, also has a second fastening region 3b for preferably releasably fastening the motor holder 3.1 to the motor or a support structure of the motor. In this case, the second fastening region 3b can be configured in the form of merely one through-bore for receiving a fastening means, preferably for receiving a pin, a screw and/or a rivet. Moreover, the second fastening region 3b can comprise a resilient bearing 7, preferably in the form of a rubber-metal buffer, which is preferably pressed into the aforementioned through-bore.

Optionally, the respective through-openings 5 of the motor holder 3.1—at least on one side—can be concentrically surrounded in each case by spacer sleeves 6. As is illustrated in connection with FIG. 4, when fastening the motor holder 3.1 to the support frame 2 of the vehicle 10, the spacing between the first limb $3l_2$ and the support frame 2 can be set via the length thereof. In other words, the spacing of the first limb $3l_1$ from the support frame can be varied by the corresponding spacer sleeves 6.

FIG. 4 shows a schematic plan view of a detail of a motor mounting system of a vehicle 10 according to a further embodiment of the invention. The vehicle 10, which is not shown in more detail, comprises once again a support frame 2 which has two longitudinal members $2b_1$, $2b_2$ which are spaced apart from each other and which are connected together via a plurality of cross members $2a_1$, $2a_2$, $2a_3$, $2a_4$, wherein an electric motor 1 is fastened to the support frame 2 by means of a plurality of motor holders 3.1, 3.2, 3.3, and 3.4 as already discussed above.

In contrast to the embodiment shown in FIG. 2, for example, the vehicle 10 additionally comprises two traction battery modules 4.1 and 4.2 which in turn can have in each case a plurality of interconnected battery cells. As can be seen in the plan view in FIG. 4, the two traction battery modules 4.1, 4.2 are fastened via the motor holders 3.1, 3.2, 3.3, 3.4 to the support frame 2, wherein in detail each of the two traction battery modules 4.1, 4.2 is attached to one of the longitudinal members $2b_1$, $2b_2$ via in each case at least two motor holders 3.1, 3.2, 3.3, 3.4. Advantageously, the motor holders thus fulfill a dual function by serving both for fastening the electric motor 1 to the support frame 2 and for fastening the traction battery modules 4.1, 4.2 to the support frame 2, so that in this context the corresponding motor holders 3.1, 3.2, 3.3, 3.4 can also be denoted as motor-battery holders.

Preferably, the attachment of the corresponding traction battery modules 4.1, 4.2 is implemented by the respective traction battery module 4.1, 4.2, the respective first fastening region 3a of the motor holders 3.1, 3.2, 3.3, 3.4 and the respective longitudinal members $2b_1$, $2b_2$ comprising through-openings 5 which correspond to one another (see also FIG. 2). In other words, all of the components are designed to have the same hole pattern in each case, i.e. the same number of through-openings in the same arrangement. For the attachment, fastening means which extend through the through-openings 5 can be received in each case in the individual through-openings for non-positively and/or positively fixing said components. For example, the first fastening region 3a of the respective motor holders 3.1, 3.2, 3.3, 3.4 can be pinned and/or screwed and/or riveted between the respective longitudinal members $2b_1$, $2b_2$ and the respective traction battery module 4.1, 4.2. As is also visible from FIG. 4, the attachment of the traction battery modules 4.1, 4.2 to the motor holders preferably takes place on the vehicle exterior, so that the traction battery modules are located at a greater transverse spacing relative to the longitudinal central plane of the vehicle 10 than the corresponding motor holders 3.1, 3.2, 3.3, 3.4.

In the present case, shown by way of example in FIG. 4, the longitudinal members $2b_1$, $2b_2$ of the vehicle 10 widen in a front region of the vehicle 10, i.e. the two longitudinal members $2b_1$, $2b_2$ do not run in parallel over their entire length at the same spacing, but a mounting position which is as uniform as possible can be advantageously provided for the traction battery modules 4.1, 4.2 via a corresponding design of the motor holders 3.1, 3.2, 3.3, 3.4. To this end, the first fastening regions 3a of the motor holders 3.1, 3.2, 3.3, 3.4 can comprise in each case at least one spacing compensating element (for example in the form of the aforementioned spacer sleeves 6), the respective extent thereof in the vehicle transverse direction Q being adapted to the transverse spacing of the respective longitudinal member $2b_1$, $2b_2$ at the corresponding mounting positions, such that the second fastening regions 3b and/or the outer faces of the motor holders 3.1, 3.2, 3.3, 3.4 on a longitudinal member $2b_1$, $2b_2$ on the vehicle exterior are located at the same transverse spacing relative to the longitudinal central plane of the vehicle 10. In the present exemplary case, the spacer sleeves 6 surrounding the through-openings 5 (see also FIG. 2) of the "front" motor holders 3.1 and 3.3 are configured to be longer than the "rear" motor holders 3.2, 3.4 so that the spacing of the two longitudinal members $2b_1$, $2b_2$, which varies at the respective mounting positions, can be compensated and a planar bearing surface of the respective traction battery modules 4.1 and 4.2 can be formed in some portions perpendicular to the vehicle transverse direction Q.

Although the invention has been described with reference to specific exemplary embodiments, it is obvious to a person skilled in the art that various modifications can be made and equivalents substituted without departing from the scope of the invention. As a result, the invention is not designed to be limited to the disclosed exemplary embodiments but to encompass all of the exemplary embodiments which fall within the scope of the accompanying claims. In particular, the invention also claims protection for the subject matter and the features of the subclaims independently of the referenced claims.

LIST OF REFERENCE SIGNS

1 Electric motor
2 Support frame
$2a_1$, $2a_2$, $2a_3$, $2a_4$ Transverse member
$2b_1$, $2b_2$ Longitudinal member
3 Holding device
3.1, 3.2, 3.3, 3.4 Motor holder
3a First fastening region
3b Second fastening region
2c Spacer
$3l_2$ First limb
$3l_2$ Second limb
4.1, 4.2 Traction battery module
5 Through-openings
6 Spacer sleeves
7 Resilient bearing
10 Vehicle

The invention claimed is:

1. A vehicle having an electric motor, wherein the vehicle comprises a support frame which has two longitudinal members which are spaced apart from each other and which are connected together via a plurality of cross members; and wherein the electric motor is fastened by means of a holding device to the support frame;
wherein the holding device comprises at least one motor holder having the following components:
a) a first fastening region which is fastened to one of the longitudinal members;
b) a second fastening region which is fastened to the electric motor or to a support structure of the electric motor; and
c) a spacer which connects the first and second fastening region and which spaces the second fastening region from the first fastening region in such a manner that the second fastening region is arranged below the longitudinal members in the vehicle vertical direction, and
wherein the vehicle comprises a traction battery module:
wherein the traction battery module is fastened by means of the at least one motor holder to the support frame; or
wherein the at least one motor holder serves both for fastening the electric motor to the support frame and for fastening the traction battery module to the support frame.

2. The vehicle as claimed in claim 1, wherein:
the vehicle is a utility vehicle; or
the longitudinal members are C-shaped profile members; or
the at least one motor holder includes four motor holders.

3. The vehicle as claimed in claim 1, wherein:
the spacer has an extent of at least 10 cm in the vehicle vertical direction; or
the second fastening region is arranged at least 10 cm below the longitudinal members in the vehicle vertical direction.

4. The vehicle as claimed in claim 3, wherein:
the extent of the spacer is at least 15 cm in the vehicle vertical direction; or
the second fastening region is arranged at least 15 cm below the longitudinal members in the vehicle vertical direction.

5. The vehicle as claimed in claim 1, wherein:
the second fastening region is arranged at the height of the center of gravity of the electric motor in the vehicle vertical direction; or
the center of gravity of the electric motor is arranged below the longitudinal members in the vehicle vertical direction.

6. The vehicle as claimed in claim 1, wherein the at least one motor holder is configured as a substantially L-shaped molded part, having a first limb and a second limb which is shorter in comparison with the first limb, wherein the first fastening region is arranged on the first limb and the second fastening region is arranged on the second limb.

7. The vehicle as claimed in claim 1, wherein the traction battery module, the first fastening region of the at least one motor holder and the longitudinal member comprise through-openings which correspond to one another and in which fastening means which extend through the corresponding through-openings are received in each case for non-positively and/or positively fixing said components.

8. The vehicle as claimed in claim 1, wherein:
the traction battery module is fastened by means of the at least one motor holder via the first fastening region thereof to the support frame; or
the traction battery module, the first fastening region of the at least one motor holder and the longitudinal member comprise through-openings which correspond to one another and arranged in a grid pattern.

9. The vehicle as claimed in claim 1, wherein:
the first fastening region of the at least one motor holder is pinned and/or screwed and/or riveted between the longitudinal member and the traction battery module; or
the traction battery module is fastened on the vehicle exterior to the at least one motor holder; or
the traction battery module and the longitudinal member are fastened on opposing sides of the first fastening region of the at least one motor holder.

10. The vehicle as claimed in claim 1, wherein:
the first fastening region of the at least one motor holder is fastened on the vehicle exterior to one of the longitudinal members; or
the first fastening region of the at least one motor holder is fastened as closely as possible to the thrust center of one of the longitudinal members; or
the second fastening region of the at least one motor holder comprises a resilient bearing for damping vibrations.

11. The vehicle as claimed in claim 10, wherein the resilient bearing is a rubber-metal buffer.

12. The vehicle as claimed in claim 1, wherein the holding device comprises at least four motor holders, wherein at least two motor holders are fastened to each of the longitudinal members at mounting positions offset in the vehicle longitudinal direction.

13. The vehicle as claimed in claim 12, wherein:
the at least four motors are identically configured; or
a transverse spacing of the two longitudinal members is widened in a front region of the vehicle, wherein the first fastening regions of the motor holders in each case comprise at least one spacing compensating element, the respective extent thereof in the vehicle transverse direction being adapted to the transverse spacing of the respective longitudinal member at the corresponding mounting positions, such that the second fastening regions and/or the outer faces of all of the motor holders on a longitudinal member on the vehicle exterior are located at the same transverse spacing relative to the longitudinal central plane of the vehicle.

14. The vehicle as claimed in claim 13, wherein:
the respective spacing compensating elements are configured in the form of spacer sleeves; or
the outer faces of all of the motor holders form in some portions on a longitudinal member a planar bearing surface, which is perpendicular to the vehicle transverse direction, for at least one traction battery module.

15. The vehicle as claimed in claim 12, further comprising at least two traction battery modules, wherein at least one traction battery module is fastened to each of the longitudinal members via at least two motor holders.

16. A motor holder for fastening a motor to a support frame of a vehicle,
wherein the motor holder is configured as a substantially L-shaped molded part having a first limb and a second limb;
wherein the first limb comprises a first fastening region for fastening the motor holder to the support frame of the vehicle; and
wherein the second limb comprises a second fastening region for fastening the motor holder to the motor or a support structure of the motor
wherein the first fastening region comprises a plurality of through-openings for receiving fastening means, the plurality of through-openings of the first fastening region are concentrically surrounded in each case by spacer sleeves, the spacing between the first limb and the support frame being able to be set via the length thereof when fastening the motor holder to the support frame of the vehicle.

17. The motor holder as claimed in claim 16, wherein:
the motor is an electric motor; or
the second limb is shorter in comparison with the first limb.

18. The motor holder as claimed in claim 16, wherein the second fastening region comprises a resilient bearing.

19. The motor holder as claimed in claim 18, wherein:
the plurality of through-openings of the first fastening region run parallel to one another; or
the fastening means are pins, screws, or rivets; or
the resilient bearing is in the form of a rubber-metal buffer.

20. A vehicle having an electric motor, wherein the vehicle comprises a support frame which has two longitudinal members which are spaced apart from each other and which are connected together via a plurality of cross members; and wherein the electric motor is fastened by means of a holding device to the support frame;
wherein the holding device comprises at least one motor holder having the following components:
a) a first fastening region which is fastened to one of the longitudinal members;
b) a second fastening region which is fastened to the electric motor or to a support structure of the electric motor; and
c) a spacer which connects the first and second fastening region and which spaces the second fastening region from the first fastening region in such a manner that the second fastening region is arranged below the longitudinal members in the vehicle vertical direction, and
wherein:
the second fastening region comprises a resilient bearing for damping vibrations, the resilient bearing being a rubber-metal buffer; or
the holding device comprises at least four motor holders, wherein at least two motor holders are fastened to each of the longitudinal members at mounting positions offset in the vehicle longitudinal direction.

* * * * *